US008954784B2

(12) United States Patent
Bower, III et al.

(10) Patent No.: US 8,954,784 B2
(45) Date of Patent: *Feb. 10, 2015

(54) REDUCED POWER FAILOVER (75) Inventors: Fred A. Bower, III, Durham, NC (US);
Gregory B. Pruett, Raleigh, NC (US);
Cale T. Rath, Byron, MN (US); **Jeffery
J. Van Heuklon**, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 274 days.

This patent is subject to a terminal disclaimer.

(21) Appl. No.: 13/541,434

(22) Filed: Jul. 3, 2012

(65) Prior Publication Data
US 2012/0272094 A1 Oct. 25, 2012

Related U.S. Application Data (63) Continuation of application No. 12/963,383, filed on Dec. 8, 2010, now Pat. No. 8,468,383.

(51) Int. Cl.
*G06F 11/00* (2006.01)
*G06F 11/20* (2006.01)
(Continued)

(52) U.S. Cl.
CPC ............. *G06F 11/2038* (2013.01); *G06F 1/30* (2013.01); *G06F 1/3203* (2013.01); *G06F 11/1658* (2013.01); *G06F 11/2023* (2013.01)
USPC ....................................... 714/4.11

(58) Field of Classification Search
CPC ........... G06F 11/2028; G06F 11/2025; G06F 11/2046; G06F 11/2041; G06F 11/1482; G06F 11/2038; G06F 11/2097; G06F 11/1474; G06F 11/1662; G06F 11/1687; G06F 11/2007; G06F 11/2023; G06F 11/2033
USPC ....................................... 714/4.11
See application file for complete search history.

(56) References Cited

U.S. PATENT DOCUMENTS 5,551,043 A   8/1996 Crump et al.
5,721,937 A   2/1998 Kurihara et al.
(Continued)

OTHER PUBLICATIONS

Chapter 25. "PostgreSQK 9.1devel Documentation—High Availability, Load Balancing and Replication", Log-Shipping Standby Servers, http://developer.postgresql.org/pgdocs/postgres/warm-standby.html, Sep. 3, 2010, pp. 1-6.
(Continued)

*Primary Examiner* — Bryce Bonzo
(74) *Attorney, Agent, or Firm* — Mark E. McBurney; Jeffrey L. Streets (57) ABSTRACT

Embodiments include a power-efficient failover method. The method includes operating a primary server at a normal operating state in which program code is executed, and dynamically generating a backup of the results of the executed program code while in the normal operating state. The method further includes operating a redundant server at a reduced power state in which less power is consumed than in the normal operating state of the primary server. The workload of the primary server may be assumed according to the backup in response to a failure of the primary server. The power state of the redundant server is managed, including maintaining the redundant server in the reduced power state prior to detecting a failure of the primary server and increasing the power state of the redundant server and assuming the workload of the primary server in response to the failure of the primary server.

7 Claims, 6 Drawing Sheets (51) Int. Cl.
*G06F 1/30* (2006.01)
*G06F 1/32* (2006.01)
*G06F 11/16* (2006.01)

(56) References Cited

U.S. PATENT DOCUMENTS

| | | |
|---|---|---|
| 7,539,888 B2 | 5/2009 | Hu et al. |
| 7,558,976 B2 | 7/2009 | Fung |
| 7,617,411 B2 | 11/2009 | Baba |
| 7,721,125 B2 | 5/2010 | Fung |
| 7,757,033 B1 | 7/2010 | Mehrotra et al. |
| 2004/0107273 A1 | 6/2004 | Biran et al. |
| 2008/0263390 A1 | 10/2008 | Baba et al. |
| 2009/0177914 A1 | 7/2009 | Winchell |
| 2010/0017643 A1 | 1/2010 | Baba et al. |

OTHER PUBLICATIONS

Mitsubishi Electric, "Hot Standby" System Control for maximum availability, MELSEC Q Series Redundant System, Mar. 2005, 4 pages.

REDUCED POWER FAILOVER

CROSS-REFERENCE TO RELATED APPLICATIONS

This application is a continuation of co-pending U.S. patent application Ser. No. 12/963,383, filed on Dec. 8, 2010.

BACKGROUND

1. Field of the Invention

The present invention relates to high-availability computer systems, and more particularly to computer systems with failover capabilities.

2. Background of the Related Art

The availability of a computer system generally refers to the fraction of time during which a computer system remains operational for its intended use. A computer system may undergo periods of scheduled or unscheduled downtime, during which the computer system is unavailable. Scheduled downtime may result, for example, from periodic maintenance or system changes that require shutting down the system. Unscheduled downtime events typically arise from some unplanned physical event, such as a hardware or software failure or environmental anomaly. Examples of unscheduled downtime events include power failures, hardware failures, a shutdown due to temperatures in excess of a threshold, severed network connections, security breaches, or various application, middleware, and operating system failures.

High availability (HA) refers generally to the ability of a system to remain available for its intended use during a given measurement period. A business providing commercial access to datacenter resources may promise a certain degree of operational continuity during a contractual measurement period. For example, a datacenter may promise an availability of 99%, which corresponds to no more than 1.68 hours of downtime per week. Some vendors exclude planned downtime from the measurement period, to increase the rated availability of a system, in which case the availability is determined solely by the amount of unplanned downtime.

One way to avoid unplanned downtime is to avoid system shutdowns through the use of a failover system. A failover refers to automatically switching over to a redundant or standby computer server, system, or network upon the failure or abnormal termination of the previously active server, system, or network. A variety of methods are known in the art for transferring workload from one server to a redundant server in the event of a failure. Redundant servers and other failover equipment consume additional power, even though by its nature, failover equipment may rarely be used. The cost of this additional power factors into the total cost of ownership of a computer system.

BRIEF SUMMARY

One embodiment provides a failover method. The method includes operating a primary server at a normal operating state in which program code is executed, and dynamically generating a backup of the results of the executed program code while in the normal operating state. The method further includes operating a redundant server at a reduced power state in which less power is consumed than in the normal operating state of the primary server. The workload of the primary server may be assumed according to the backup in response to a failure of the primary server. The power state of the redundant server is managed, including maintaining the redundant server in the reduced power state prior to detecting a failure of the primary server and increasing the power state of the redundant server and assuming the workload of the primary server in response to the failure of the primary server. The method may be implemented by a computer according to computer executable program code embodied on a storage medium.

DETAILED DESCRIPTION

Embodiments of the present invention are directed to a power-efficient failover system providing rapid failover capabilities comparable to some of the conventional, high-powered, high availability (HA) configurations, yet in a more power-efficient manner than conventional HA configurations. A conventional failover system provides a redundant server having the same server hardware and functional state as the primary server, so that if the primary server were to fail, the workload of the primary server may be transferred to the redundant server with low latency. By contrast, systems and methods according to the present invention reduce power consumption by maintaining a redundant server in a reduced power state, providing only enough power to receive and process backups from the primary server until the event of a failure of the primary server.

Embodiments of the invention may be applied to any system having a failover pair of servers, configured as separate nodes that are under the control of a common management infrastructure. An external manager is provided to control power states out-of-band on a secondary node, so that the primary and secondary nodes are managed in a common control domain. Embodiments are discussed, by way of example, in the context of a multi-blade chassis, in which case the management infrastructure may include multiple controllers and chassis.

Generally, two servers, configured as nodes, are interconnected as a failover cluster in which one server is designated as a primary server and the other server is designated as a redundant server. The primary server dynamically generates a backup that can be used by the redundant server to assume the workload of the primary server in the event of a failure. Each generated backup may be referred to as a checkpoint, in that the redundant server may assume the workload of the failed primary server according to the most recent backup. The backup may include archiving the binary state of system devices, such as a binary disk state and binary memory state of the primary server to the redundant server. Alternatively, a copy of a database from the primary server may be kept on the redundant server, and the primary server generates the backup by shipping transaction logs used by the redundant server to keep the copy of the database current. The redundant server is maintained in a reduced power state, such as an ACPI power state, while receiving and processing the backups. The redundant server is preferably brought to a normal operating state only in response to a failure of the primary server.

In one embodiment, an external manager maintains the redundant server in a constant power state using the lowest power state capable of receiving and processing the backups from the primary server. Alternatively, the external manager may maintain the redundant server in a reduced power state between backups, and periodically transitions the redundant server, out-of-band, to a higher power state sufficient to receive and process the backups. In either case, the redundant server consumes significantly less power than a standby server in a conventional failover system, while still providing an acceptable latency to failover.

In a multi-blade chassis embodiment, two or more blades within the chassis may be configured in a failover cluster, and a chassis management controller acts as the external manager. The chassis management controller controls the power states of the managed blades out-of-band. For example, the chassis management controller could selectively throttle and/or power up a redundant server periodically so that the primary server may perform the checkpoint, such as to save a binary device state or ship a transaction log. A user-configurable level of power savings may also be obtained. Utilizing typical multi-core server processors in a server architecture, for example, a chassis management controller can throttle one or more processors of a redundant server, netting power savings while in a reduced power state, such as a Standby or Suspended power state. Failover latency times could also be user-configurable, with additional power savings possible in exchange for an increased latency to failover.

Figure 1:
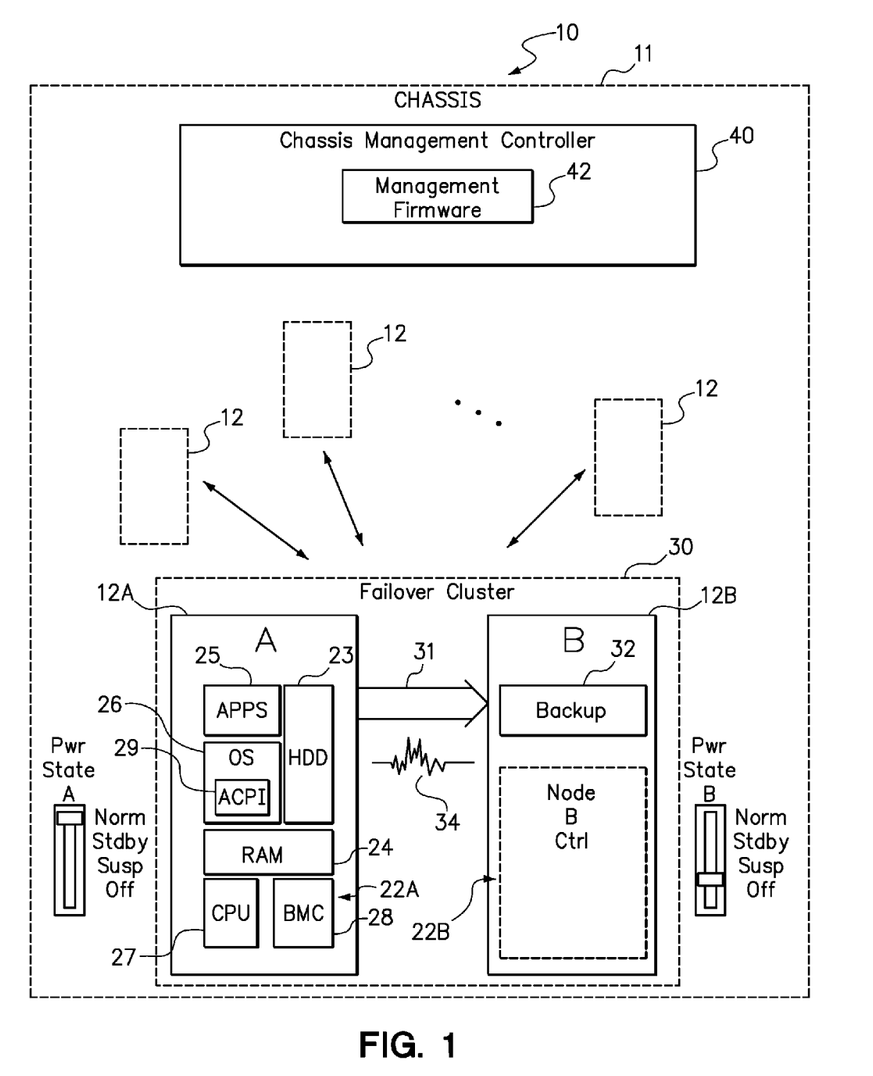
FIG. 1 is a schematic diagram of a computer system providing failover capabilities with less power consumption according to an embodiment of the invention.

FIG. 1 is a schematic diagram of a computer system 10 providing failover capabilities with reduced power consumption according to an embodiment of the invention. The computer system 10 includes a plurality of servers 12 interconnected within a chassis 11. The computer system 10 also includes a chassis management controller 40 including management firmware 42 for managing power to the components of the chassis 11. At one management level, the chassis management controller 40 may enforce a power management policy, such as by allocating power from a chassis power budget to each of the servers 12. In applying the power management policy, the chassis management controller 40 may enforce power caps to limit the full power consumption of the servers 12. The chassis management controller 40 may also control the selection of power states of the servers 12. It should be noted, however, that the scope of the invention is not limited to chassis-installed servers as in the embodiment of FIG. 1, but also any servers capable of being operated in a redundant HA cluster, so long as the servers have the ability to be placed in or activated out of power saving state(s) by an external management controller. Thus, the management controller in another embodiment may be in another server, or may include a separate microcontroller device embedded within a chassis or rack assembly.

Referring again to FIG. 1, two of the servers 12A (Server "A") and 12B (Server "B") are shown coupled as a failover cluster 30, with appropriate physical and logical connections (clustering connections) 31. The clustering connections between the two servers 12A, 12B may be selected from a variety of connection types, including but not limited to a conventional network connection. A specialty connection system could also be selected to provide a faster connection speed than normally provided by a conventional network connection. Additional servers 12 may also provide failure capabilities, such as by participating in the failover cluster 30 or forming other failover clusters within the computer system 10. Within the particular cluster 30, Server A may initially be designated as the "primary server" 12A and Server B may be designated as the "redundant server" 12B to the primary server 12A. Server B may alternately be referred to as the backup server or standby server, although the term "standby server" is not intended to imply that Server B is limited to operating in the Standby power state discussed below.

A non-exhaustive selection of software elements and hardware devices of the primary server 12A are provided in FIG. 1. Selected hardware devices includes a long-term storage, which may include one or more hard disk drive (HDD) 23, and random access memory (RAM) 24, which may include one or more dual in-line memory modules (DIMM). Software elements include an operating system (OS) 25 and one or more client applications 26, both of which may be stored in long-term storage on the HDD 23 and selectively loaded into RAM 24. Executable program code from the OS 25 may be loaded from long-term storage on the HDD 23 into RAM 24 upon system booting. After the OS 25 boots, executable program code from the client applications 26 may also be selectively loaded from long-term storage on the HDD 23 into RAM 24. A processor in the form of a central processing unit (CPU) 27 executes the program code inside the domain of the OS 25. Another processor in the form of a baseboard management controller (BMC) provides system control external to the domain of the OS 25.

The redundant server 12B may be (but is not required to be) similar or identical to the primary server 12A. Thus, certain details of the server 12B are omitted for clarity. Providing the redundant server 12B with a similar hardware and software configuration gives the redundant server 12B the necessary capabilities to assume the workload of the primary server 12A, including the execution of any client applications 26 currently running on the primary server 12A. Using a redundant server 12B having the same or similar hardware and software configuration also facilitates the primary server 12A and redundant server 12B to switch roles at some point such that Server B becomes the primary server and Server A becomes the redundant server.

Each server 12 is operable at any of a plurality of independently variable power states. Each power state has a different level of power consumption associated therewith. Power states are commonly defined according to computer industry standards. The ACPI (Advanced Configuration and Power Interface) standard, for example, specifies one set of ACPI power states known as "power-performance" states or simply "P-states" for processors and other devices. Such a standard may designate a plurality of P-states from P0 to Pn, with P0 being the highest performance state and with P1 to Pn being successively lower-performance states. The ACPI standard also specifies other states such as system state G0 (working) through G3 (mechanical off), and D0 (fully-on) through D3 (off). As another example, according to such a standard, a "working" state may be considered an elevated power state relative to an "off" state.

Techniques for controlling the power state of a device in a computer system are generally known in the art under a variety of different trade names. For example, Intel Speed- Step® is a registered trademark for computer hardware, computer software, computer operating systems, and application specific integrated circuits (ASIC) to enable automatic transitioning between levels of voltage and frequency performance of the computer processor and computer system. Similarly, AMD PowerNow® is a registered trademark for another technology that enables automatic transitions between performance states by virtue of managing operating frequency and voltage. Such techniques of controlling frequency and/or voltage may be used to enforce a power state that has been requested and selectively authorized according to an embodiment of the invention.

The primary server 12A includes a local controller generally indicated at 22A for enforcing a selected power state of the primary server 12A. Components that may participate in controlling the power state of the primary server 12A include the CPU 27, BMC 28, and Advanced Configuration and Power Interface (ACPI) 29. Additional elements that may be involved in power saving states are fans, hard disk drives, memory controllers, disk controllers, memory devices, input/output (I/O) adapters, the operating system (OS) 25, and specialized application code. The redundant server 12B includes a local controller 22B for enforcing a power state of the redundant server 12B. Certain features of the local controller 22B may be similar to the local controller 22A, and are omitted from FIG. 1 for clarity. In this embodiment, each controller 22A, 22B includes ACPI 29, which is a component of the OS 25. ACPI 29 uses its own ACPI Machine Language (AML) for implementing a power event handler or AML method. Certain control aspects of the local controller 22A, 22B may also be provided by the CPU 27 and the BMC 28. The AML method receives instructions from the BMC 28 through a system message interface and the general purpose I/O ports of a Super I/O. The AML method changes the state of a CPU 27, in accordance with the instructions, and may send messages back to the BMC 28 confirming the new ACPI state of the CPU 27.

Four power states are shown, by way of example, as being available to each of the primary server 12A and the redundant server 12B. These four example power states are a "Normal" operating state, a "Standby" state, a "Suspended" state, and an "Off" state. U.S. Pat. No. 5,551,043, currently assigned to IBM, discusses how these four power states may be implemented in a personal computer (PC), which one of ordinary skill in the art would recognize may have analogs for use in servers. The four power states are listed in order of decreasing power consumption with the Normal operating state consuming the most power and the Off state consuming the least power. The Normal operating state allows a given server 12 in that power state to execute program code normally, and to consume up to a full amount of power available to that server 12. By comparison, the Standby, Suspended, and Off power states are considered reduced power states, each having a reduced level of functionality and associated lower power consumption than the Normal operating state.

The Standby power state is a reduced power state in which application program code may still be executed as it would be in the Normal operating state. However, power consumption is reduced in Standby by limiting the functionality of the server 12, such as by halting the revolutions of a hard disk or ceasing to generate a video signal. On a server, power could be reduced to the CPU 27 and RAM 24. The CPU frequency could also be reduced. Still further, multiple low-power states could be provided wherein processing continues. For example, the IBM POWER system provides both a static power saver state and a dynamical power saver state.

A server 12 in the Suspended power state has less functionality and consumes less power than when in the Standby power state. Program code is not typically executed while in the Standby state, so that a server 12 consumes very little power while in the Suspended power state. However, the server 12 is not fully powered off in Suspended state, and a power supply may remain energized. The binary device states of system devices included with the server 12, such as the "memory state" of system memory or "disk state" of an HDD, may be stored to long-term storage, such as to a hard disk drive (HDD), in the process of transitioning to the Suspended power state.

The term "device state" is distinguished from the term "power state" as those terms are used herein. Here, the term "device state" as used herein refers to the particular binary state of a device (e.g. the server 12 or a hardware component of the server 12) at a particular computer cycle, and is not to be confused with an ACPI-defined device state, which relates instead to the power state of a device. All memory locations and registers will have a particular set of binary values at any given cycle. The binary device state is analogous to a snapshot of that binary state at a given cycle. Storing the binary device states of server components prior to entering Suspended mode allows the server to be restored to those same device states upon transitioning back to Normal operating state, so that the server 12 may resume operations substantially where it left off immediately prior to initiating the Suspended state.

A server 12 in the Off state consumes the least power of any of the four example power states. In the Off state, a power supply to the server 12 may be de-energized to cease supplying regulated power to the server 12. Furthermore, the state of the computer system is typically not saved prior to entering the Off power state. Rather, when power is restored to the server 12, the OS reboots the server 12 and typically returns to the Normal operating state.

Other reduced power states are known in the art, in addition to the three examples of Standby, Suspended, and Off. Examples of other reduced power states that may be employed by any of the servers 12 include core parking, core disabling, performance or clock throttling, memory power reduction, and hard disk spindowns. Each of these reduced power states has a decreased level of functionality and correspondingly reduced power consumption as compared to a Normal operating state. These and other reduced power states are generally understood in the art apart from the particular application and control of these reduced power states described herein.

Power consumption is minimized in the failover cluster 30 by placing the redundant server 12B in a lower power state than the primary server 12A, while the primary server 12A is executing program code in the Normal operating state. The primary server 12A dynamically generates a backup 32 of the primary server 12A and communicates the backup 32 over the clustering connections 31 to the redundant server 12B. The backup 32 reflects the current state of execution of the program code while in the Normal operating state. As further discussed below, the redundant server 12B may assume the workload of the primary server 12A according to the most recently saved backup 32 in the event of a failure of the primary server 12A.

Any of a variety of methods may be used for triggering a failover. By way of example, a heartbeat monitor 34 is employed in the present embodiment for automatically detecting a failure of the primary server 12A. A number of heartbeat-loss-detection methods generally known in the art may be adapted for use in this embodiment. The heartbeat monitor 34 is, in clustering terminology, a daemon or process that drives this automatic detection. The heartbeat monitor 34 may also include a heartbeat cable connecting the two servers 12A, 12B. The heartbeat monitor 34 involves a process that checks on the operational status of the primary server 12A, to ensure that the primary server 12A is up and running. If a heartbeat is no longer detected at some point, indicating a failure or other abnormal operation of the primary server 12A, a failover may then be performed. In performing the failover, the chassis management controller 40 may elevate the power state of the redundant server 12B to Normal operating state and assume the workload previously being executed by the primary server 12A, based on the most recent backup 32.

Figure 2:
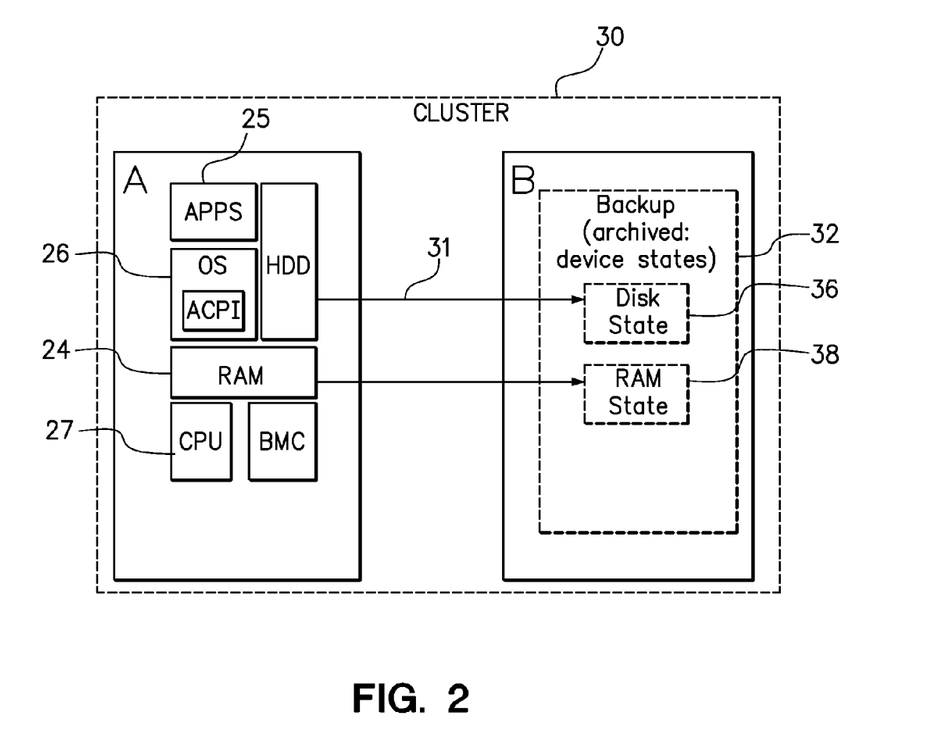
FIG. 2 is a schematic diagram of the failover cluster according to one embodiment, wherein backing up the primary server comprises archiving binary device states of the primary server to the redundant server.

FIG. 2 is a schematic diagram of the failover cluster 30 according to one embodiment, wherein the backup 32 comprises archived device states of the primary server 12A. As discussed above, device states may include a disk state 36 and system memory (RAM) state 38 at a given cycle. As the program code of the OS 25 and client applications 26 is executed, the CPU 27 processes data and stores the results in RAM 24. This execution of program code causes a continuously changing RAM 24, stored as the RAM state 38, and device state of the HDD, stored as the disk state 36. By dynamically archiving these (and potentially other) device states, the backup 32 provides a continuously updated reference by which the redundant server 12B may assume the workload of the primary server 12A in the event of a failure. Archiving the device state of the primary server 12A typically involves transferring the entire hard disk and memory state, or at least the portion that has changed since the previous archive. Certain network bandwidth and latency costs are attributable to this transfer of device states, which may comprise a substantial amount of data.

Figure 3:
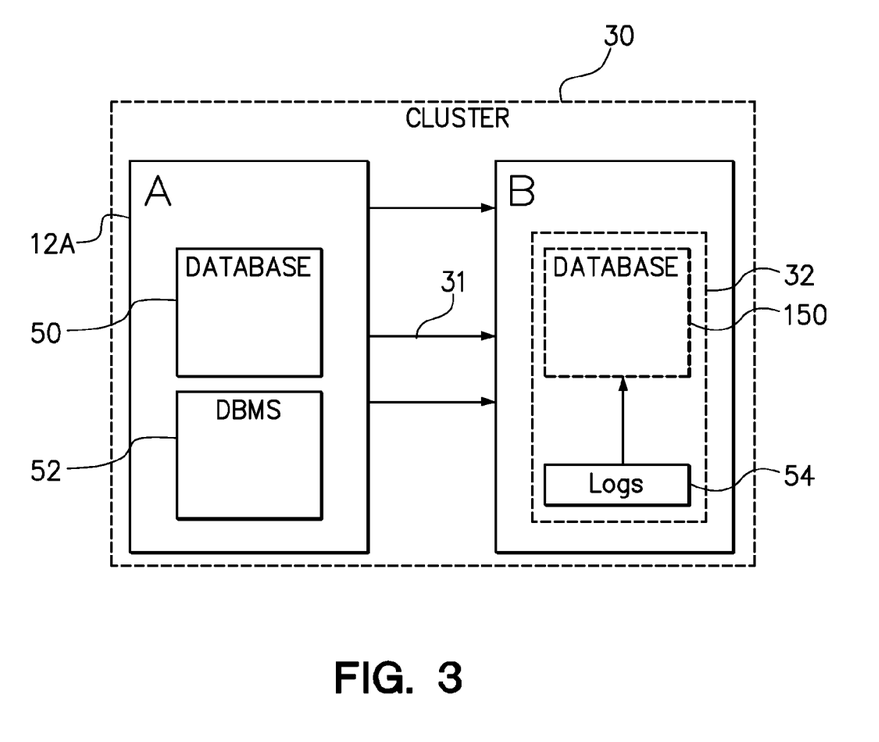
FIG. 3 is a schematic diagram of the failover cluster according to an alternate embodiment, wherein backing up the primary server involve write-ahead logging.

FIG. 3 is a schematic diagram of the failover cluster 30 according to an alternate embodiment, wherein the backups involve write-ahead logging (WAL). WAL is particularly suitable for use wherein databases, as a specialized version of a client application 26, are used. WAL is a family of techniques for providing atomicity and durability in database systems. In this embodiment, components of a database 50 and database management system (DBMS) 52 are stored on the primary server 12A. In the field of databases in computer science, a single logical operation on the database 50 is called a transaction. The backup 32 in this embodiment comprises a transaction log 54. A transaction log (alternatively referred to as a database log or binary log) is a history of transactions executed by the database management system 52. Each transaction results in an update to the transaction log 54. The transaction log is transmitted from the primary server 12A to the redundant server 12B, which is a process known as log shipping. A standby database 150 is provided on the redundant server 12B. The standby database 150 is initially provided as a complete copy of the database 50 from the primary server 12A. The redundant server 12B continuously "rolls forward" through the logs 54 provided by the primary server 12A, ensuring that the standby database 150 is current up to the most recent log 54. In the event of a failure of the primary server 12A, the redundant server 12B rolls through any remaining logs 54, to update the standby database 150 according to the most recent log 54 that was successfully shipped. Clients can then be automatically reconnected from the primary server 12A to the redundant server 12B.

In either of the embodiments discussed with reference to FIGS. 2 and 3, once the primary server 12A fails and the redundant server 12B assumes the workload of the primary server 12A, any clients may be automatically reconnected from the primary server 12A to the redundant server 12B. Each server 12, including each of the primary server 12A and redundant server 12B, is configured as a node. Each node may be assigned an internet protocol (IP) address, or other identifier, allowing client applications to connect according to that identifier. For example, in the primary server 12A fails, the IP address formerly assigned to the primary server 12A may be reassigned to the redundant server 12B. Any client connected to the primary server 12B by IP address may thus be seamlessly reconnected to the redundant server 12B, which has now assumed the IP address or other node identifier formerly assigned to the primary server 12A.

Also, in either of the embodiments discussed with reference to FIGS. 2 and 3, once the redundant server 12B assumes the workload of the primary server 12A, the server 12B may temporarily operate without its own redundant server while the former primary server 12A is unavailable. This is known as a degenerate state. Depending on the circumstances of the failure, the server 12A might stay down indefinitely. To restore a failover operation, a redundant server must be assigned, either using the former primary server when it is restored, or on a third system. If the former primary server becomes the redundant server, the primary and redundant servers can be considered to have switched roles. A third server may be used as the redundant server until the server 12A is restored, though this requires the complication and expense of adding an additional server to the system.

In either of the embodiments discussed with reference to FIGS. 2 and 3, power may be conserved using a variety of methodologies, each of which involves placing the redundant server in a lower power state than the primary server. Example methodologies for minimizing the power consumption in a failover cluster are provided in FIGS. 4 and 5. The methodologies provided in FIGS. 4 and 5 may be applied to either of the embodiments of FIGS. 2 and 3. Thus, the following discussion of these methods may be further informed by reference to the above discussion of FIGS. 2 and 3.

Figure 4:
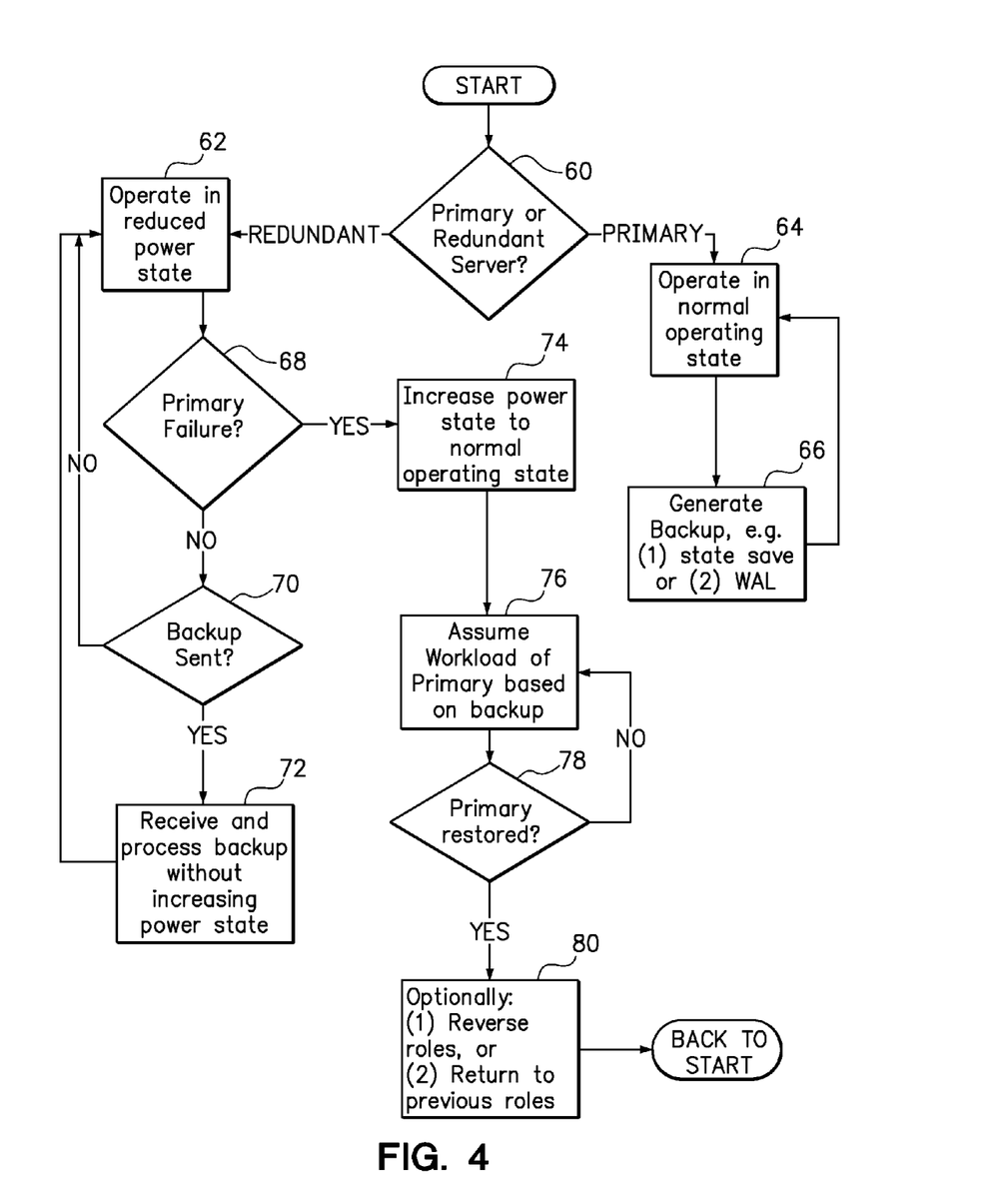
FIG. 4 is a flowchart of a failover method wherein a redundant server in a failover cluster is maintained at a constant, reduced power state unless and until a failure of the primary server.

FIG. 4 is a flowchart of a failover method wherein a redundant server in a failover cluster is maintained at a constant, reduced power state at just enough power to receive and process backups in the form of device state saves or write-ahead logging. The flowchart begins with a conditional step 60 where the flowchart splits according to whether the primary or secondary (redundant) server is being controlled by a particular step. According to step 64, the primary server is operated in the normal operating state. Simultaneously, according to step 62, the redundant server is operated in a reduced power state. Accordingly, the reduced power state currently occupied by the redundant server has lower power consumption than the normal operating state occupied by the primary server.

While the primary server is operated in the normal operating state, the primary server continuously generates a backup according to step 66. The backup may be, for example, a device state save or a write-ahead log. Meanwhile, as the redundant server is operating in the reduced power state, conditional step 68 involves the detection of a primary server failure. Assuming no failure is detected per step 68, conditional step 70 involves detecting any backups sent by the primary server. If no backup is sent at a particular instant in which step 70 is applied, then the redundant server continues to operate in the reduced power state per step 62. However, if a backup is sent, the redundant server receives and processes the backup per step 72.

The backup is received and processed in step 72 of FIG. 4 without elevating the power state. That is, the power state selected for the redundant server 72 in FIG. 4 may be at the minimum power consumption possible for processing the backups. As applied to the embodiment of FIG. 2, for example, the power state would be sufficient to receive the archived device states, and as applied to FIG. 3, the power state would be sufficient to receive and process the transaction logs. In one implementation, the chassis management firmware may cause power to the redundant server to be continuously capped and run in a very low-power mode, such as by parking all but the minimal number of processor cores required for the heartbeat and/or checkpointing with the redundant server.

If a primary failure is detected in conditional step 68, then, per step 74, the power state of the redundant server is increased from the reduced power management state to a power state in which program code may be normally executed, such as the normal operating state. In step 76, the workload from the primary server is then assumed by the redundant server. Per conditional step 78, if the primary server is not restored, then the redundant server continues to assume the workload of the primary server. However, if the primary server is restored per conditional step 78, then two example options are presented in step 80. One option is to reverse the roles of the two servers; that is, the server in the failover cluster that was formerly the redundant server and assumed the workload in step 76 now becomes the primary server, while the other server in the failover cluster becomes the redundant server. Alternatively, according to step 80, the former roles may be resumed, whereby the workload is passed back to the server that was originally designated as the primary server, and the redundant server is placed back in a reduced power management state. In either case, the method of FIG. 4 may resume with conditional step 60, where the flowchart splits according to whether the primary or redundant server in the failover cluster is to be controlled.

Figure 5:
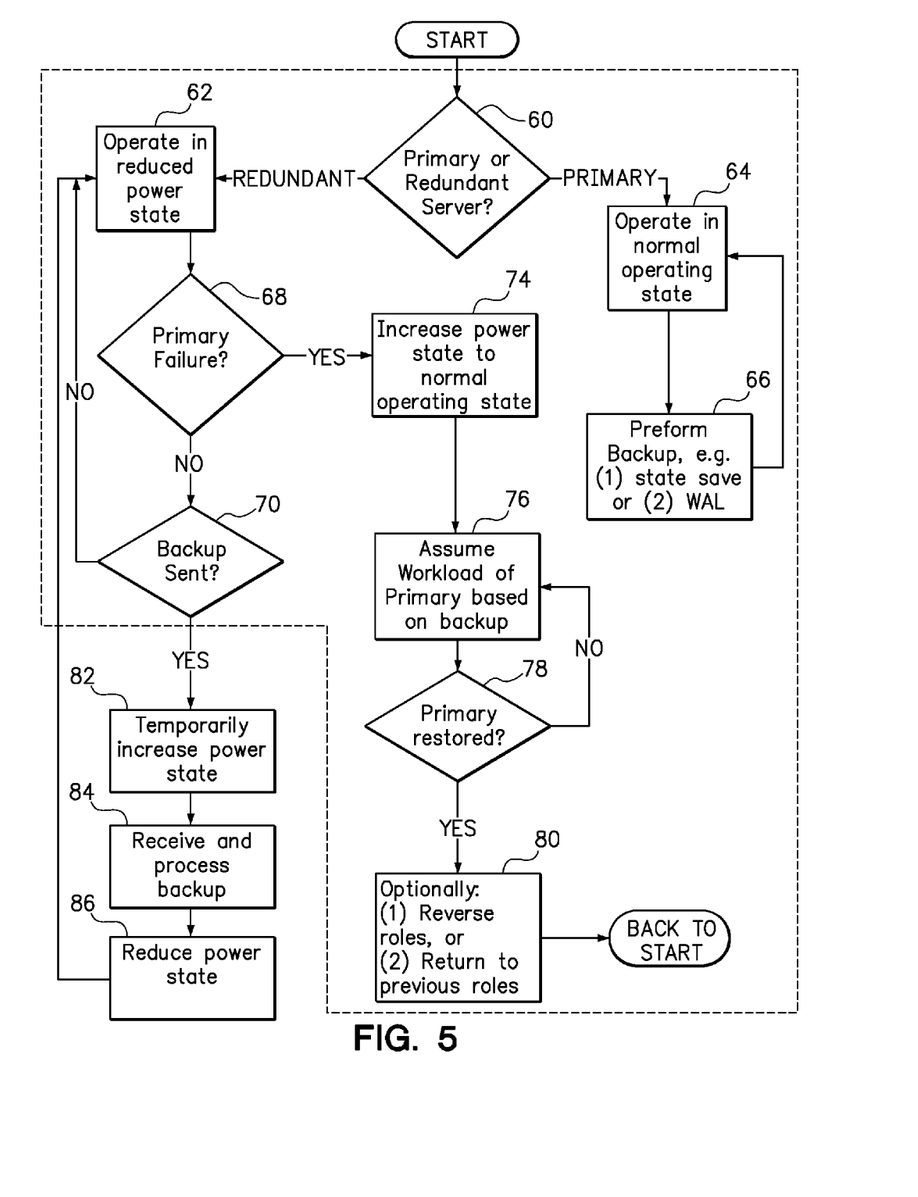
FIG. 5 is flowchart of a failover method according to another embodiment of the invention, wherein a reduced power state of a redundant server is temporarily elevated for the purpose of receiving and processing updates.

FIG. 5 is a flowchart of a failover method according to another embodiment of the invention, wherein a reduced power state of a redundant server is temporarily elevated for the purpose of receiving and processing updates. A portion of the flowchart outlined in dashed lines includes many steps identical to or analogous to the steps of FIG. 4, which are accorded like reference numerals. One difference, however, is that in the method of FIG. 4, the reduced power state (step 62) was sufficient to process backups, such as to perform checkpointing, device state saves, WAL, or combinations thereof. In the method of FIG. 5, the redundant server is placed in an even lower power state that may be insufficient to process backups. Accordingly, in response to a backup being sent (conditional step 70), the power state of the redundant server is temporarily increased in step 82, to a power state providing sufficient power for receiving and processing the backup in step 84. After receiving and processing the backup, the redundant server may be returned to the previously reduced power state per step 86. Either the primary server or the management controller can initiate these backups. In one embodiment, the primary server may assume this responsibility to effect the power state change by out-of-band access to the appropriate management controllers in the system and/or chassis.

Figure 6:
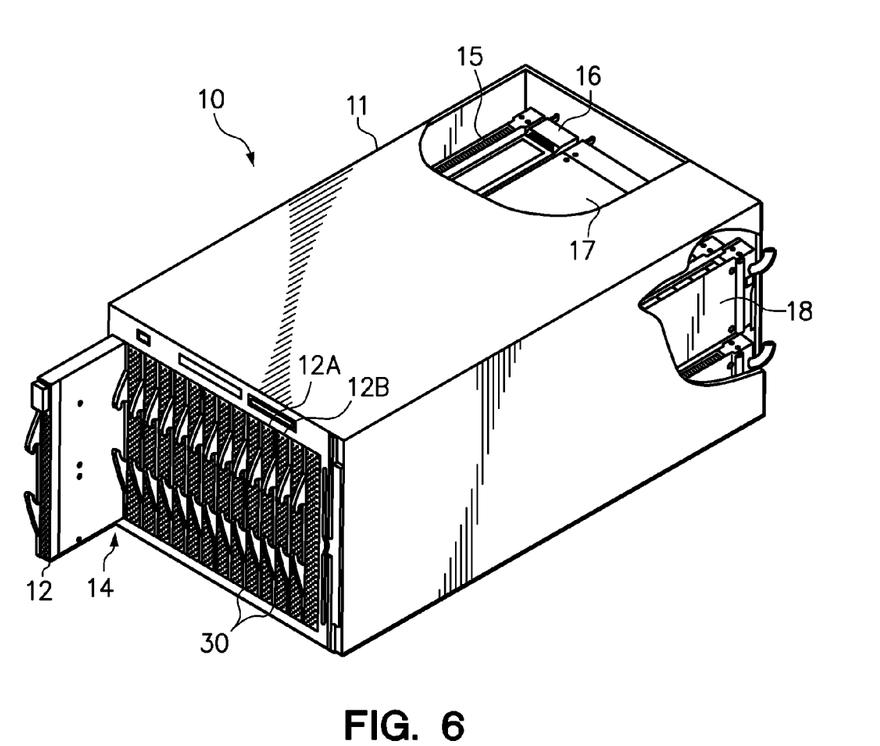
FIG. 6 is a perspective view of an example of a rack-mountable computer system in which a failover system may be implemented.

FIG. 6 is a perspective view of an example of a rack-mountable computer system 10 in which a failover system may be implemented according to any of the above embodiments of the invention. FIG. 6 provides additional structural details to supplement the description provided in the schematic diagrams of FIGS. 1-3. The computer system 10 in the FIG. 6 embodiment has a chassis 11 with fourteen server bays 14. Each server bay 14 receives one of the fourteen blades 12. The blades 12 may include networked server blades, workstation blades, or other modular computers or components having a blade form factor. Each blade 12 may act as a node.

The blades 12 share system resources such as power, cooling, and network connectivity provided by various support modules in the chassis 10. The support modules include a chassis management controller 40, a power supply module 16, a fan assembly 17, and a network switch module 18. The chassis management controller 40 manages the computer system 11, including the servers 12 and the support modules within the chassis. The power module 16 provides electrical power to all of the servers 12. The fan assembly 17 generates airflow through the chassis 11 to remove the heat generated by the servers 12 and support modules. The switch module 18 provides network connectivity between the blade server I/O and the network. The servers 12 and support modules are interconnected within the chassis 11 to provide power and data signal communication. The servers 12 and support modules may interconnect, for example, at an internal chassis interface known as the midplane, which has rigid connectors for docking the blade servers 12 and support modules. Cable connections may also be made within the chassis 11, although the midplane may reduce or eliminate cabling requirements. Any two of the servers 12 may be interconnected to form a failover cluster per the above-described embodiments. Thus, the chassis 11 may house multiple failover clusters. In another embodiment, any two servers may be configured as blades, as noted above, as the scope of the invention is not limited to use with chassis-resident blade servers.

While the failover cluster is discussed herein largely in the context of a two-server cluster consisting of a single primary server and a single redundant server, it should be appreciated that a failover cluster may include more than two servers. For example, two or more servers 12 may be configured to independently fail over to the same third server 12, in the event that either (or both) of the first two servers were to fail. Examples of high-availability cluster configurations that will be recognized by those of ordinary skill in the art include an "idle standby" configuration, a "mutual takeover" configuration, an "active standby" configuration, and a "balanced mutual takeover" configuration.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A failover method, comprising:
   operating a primary server at a normal operating state in which program code is executed;
   dynamically generating a backup of the results of the executed program code while in the normal operating state;
   operating a redundant server at a reduced power state consuming less power than the normal operating state of the primary server;
   assuming the workload of the primary server according to the backup in response to a failure of the primary server; and
   managing the power state of the redundant server, including maintaining the redundant server in the reduced power state prior to detecting a failure of the primary server and increasing the power state of the redundant server and assuming the workload of the primary server in response to the failure of the primary server.

2. The failover method of claim 1, further comprising maintaining the redundant server in the reduced power state between backups and temporarily increasing the power state for receiving and processing each backup from the primary server.

3. The failover method of claim 2, further comprising:
periodically triggering the increased power state of the redundant server at a predefined schedule while receiving and processing each backup according to the predefined schedule.

4. The failover method of claim 1, further comprising maintaining the redundant server in a substantially constant, reduced power state sufficient to receive and process the backups.

5. The failover method of claim 1, wherein the step of generating the backup comprises archiving a system state of the primary server.

6. The failover method of claim 1, further comprising:
copying transaction logs from the primary server to the redundant server, wherein the redundant server includes a copy of a database from the primary server being operated upon by the executed program code; and
rolling forward the copied transaction logs.

7. The failover method of claim 1, further comprising:
a first server operable in the normal operating state to execute program code on the first server;
a second server clustered with the first sever and operable in the normal operating state to execute program code on the second server; and
wherein the first server is the redundant server to the second server and the second server is simultaneously the redundant server to the first server.

* * * * *